(12) United States Patent
Cabot (10) Patent No.: US 12,478,090 B2
(45) Date of Patent: Nov. 25, 2025

(54) AEROSOLIZABLE FORMULATION

(71) Applicant: NICOVENTURES TRADING LIMITED, London (GB)

(72) Inventor: Ross Cabot, London (GB)

(73) Assignee: NICOVENTURES TRADING LIMITED, London (GB)

( * ) Notice: Subject to any disclaimer, the term of this patent is extended or adjusted under 35 U.S.C. 154(b) by 973 days.

(21) Appl. No.: 17/290,328

(22) PCT Filed: Oct. 31, 2019

(86) PCT No.: PCT/GB2019/053088
§ 371 (c)(1),
(2) Date: Apr. 30, 2021

(87) PCT Pub. No.: WO2020/089634
PCT Pub. Date: May 7, 2020

(65) Prior Publication Data
US 2021/0378282 A1    Dec. 9, 2021

(30) Foreign Application Priority Data

Nov. 1, 2018  (GB) ...................................... 1817864

(51) Int. Cl.
| | |
|---|---|
| *A24B 15/167* | (2020.01) |
| *A24B 15/28* | (2006.01) |
| *A24F 40/10* | (2020.01) |

(52) U.S. Cl.
CPC .......... *A24B 15/167* (2016.11); *A24B 15/283* (2013.01); *A24F 40/10* (2020.01)

(58) Field of Classification Search
CPC ... A24B 15/167; A24B 15/283; A24B 15/243; A24B 15/30; A24B 15/301; A24B 15/32;
(Continued)

(56) References Cited

U.S. PATENT DOCUMENTS

| | | | | |
|---|---|---|---|---|
| 4,830,028 A | * | 5/1989 | Lawson ................. | A24B 15/30 514/343 |
| 5,016,655 A | * | 5/1991 | Waddell ................. | A24B 15/30 131/334 |

(Continued)

FOREIGN PATENT DOCUMENTS

| | | | |
|---|---|---|---|
| CA | 2934413 A1 | * | 6/2015 |
| CN | 101390659 | | 3/2009 |

(Continued)

OTHER PUBLICATIONS

International Search Report and Written Opinion PCT/GB2019/053088 date mailed Jan. 21, 2020.

(Continued)

*Primary Examiner* — Jean F Duverne
(74) *Attorney, Agent, or Firm* — Womble Bond Dickinson (US) LLP; Mark R. DeLuca (57) ABSTRACT

An aerosolizable formulation comprising (i) water, (ii) nicotine, (iii) at least one acid, (iv) one or more flavors, and (v) one or more encapsulating materials, wherein the encapsulating material encapsulates at least one of the one or more flavors in preference to protonated nicotine; wherein the molar ratio of (a) encapsulating material encapsulating the one or more flavors to (b) unencapsulated flavors is greater than the molar ratio of (c) encapsulating material encapsulating nicotine to (d) unencapsulated nicotine. A process for forming the aerosolizable formulation, the aerosolizable formulation contained within a container, and an electronic aerosol provision system capable of aerosolizing the aerosolizable formulation for inhalation by a user.

31 Claims, 2 Drawing Sheets

(58) Field of Classification Search
CPC ....... A24B 15/34; A24B 15/403; A24F 40/10; A24F 40/42; Y02E 60/10; A51K 31/465; H01M 2220/30
See application file for complete search history.

(56) References Cited

U.S. PATENT DOCUMENTS

| | | | |
|---|---|---|---|
| 2004/0034068 A1 | 2/2004 | Kihlstroam | |
| 2008/0138399 A1 | 6/2008 | Gonda | |
| 2013/0206153 A1* | 8/2013 | Beeson | A24B 15/24 |
| | | | 131/297 |
| 2016/0198759 A1 | 7/2016 | Kuntawala et al. | |
| 2016/0338407 A1 | 11/2016 | Kerdemelidis | |
| 2017/0303594 A1 | 10/2017 | Cameron et al. | |
| 2017/0325494 A1 | 11/2017 | Cameron et al. | |
| 2018/0000152 A1 | 1/2018 | Ito et al. | |
| 2020/0196658 A1* | 6/2020 | McClanahan | A24B 15/24 |
| 2021/0368852 A1* | 12/2021 | Cabot | A24F 40/05 |

FOREIGN PATENT DOCUMENTS

| | | |
|---|---|---|
| DE | 102015117811 | 4/2017 |
| EP | 2842640 | 3/2015 |
| KR | 20160008271 | 1/2016 |
| WO | 2003101454 | 12/2003 |
| WO | 2009015142 | 1/2009 |
| WO | 2014187770 | 11/2014 |
| WO | WO2015092748 | 6/2015 |
| WO | WO-2015092749 A1 * | 6/2015 ............... A23G 4/20 |
| WO | WO-2015167629 A1 * | 11/2015 ............. A24B 15/10 |
| WO | 2016020675 | 2/2016 |
| WO | WO2016071705 | 5/2016 |
| WO | 2017175218 | 10/2017 |
| WO | WO-2019086858 A1 * | 5/2019 ............. A24B 15/16 |

OTHER PUBLICATIONS

Clayton P M et al., Spectroscopic investigations into the acid-base properties of nicotine at different temperatures, Anal Methods, 2013, vol. 5, pp. 81-88.
British and European Pharmacopoeia, 2.9.31 Particle Size Analysis By Laser Light Diffraction. British Pharmacopoeia Commission. (2014), British Pharmacopoeia. London, England: Stationery Office and Council of Europe. (2013). European Pharmacopoeia. Strasbourg, France: Council of Europe.
Reason for Rejection issued by the Japanese Patent Office for Japanese application No. 2021 523225, dated Aug. 19, 2022.
Office Action issued by the Russian Patent Office for Russian application No. 2021112017/03(025702).
Chinese Search Report issued in Chinese application No. 2019800758176.
Japanese Office Action issued for Japanese application No. 2021-523225.

* cited by examiner

AEROSOLIZABLE FORMULATION

PRIORITY CLAIM

The present application is a National Phase entry of PCT Application No. PCT/GB2019/053088, filed Oct. 31, 2019 which claims priority from GB Patent Application No. 1817864.0 filed Nov. 1, 2018, each of which is hereby fully incorporated herein by reference.

FIELD OF THE INVENTION

The present disclosure relates to an aerosolizable formulation, a method of forming the same, a container containing the same, a device containing the same and processes and uses of the same.

BACKGROUND TO THE INVENTION

Electronic aerosol provision systems such as e-cigarettes generally contain a reservoir of liquid which is to be vaporized, typically containing nicotine. When a user inhales on the device, a heater is activated to vaporize a small amount of liquid, which is therefore inhaled by the user.

The use of e-cigarettes in the UK has grown rapidly, and it has been estimated that there are now over a million people using them in the UK.

One challenge faced in providing such systems is to provide from the aerosol provision device a aerosol to be inhaled which provides consumers with an acceptable experience. Some consumers may prefer an e-cigarette that generates an aerosol that closely 'mimics' smoke inhaled from a tobacco product such as a cigarette. Aerosols from e-cigarettes and smoke from tobacco products such as cigarettes provides to the user a complex chain of flavor in the mouth, nicotine absorption in the mouth and throat, followed by nicotine absorption in the lungs. These various aspects are described by users in terms of flavor, intensity/quality, impact, irritation/smoothness and nicotine reward. Nicotine contributes to a number of these factors, and is strongly associated with factors such as impact, irritation and smoothness; these are readily perceived by consumers, and e-cigarettes may offer too much or too little of these parameters for consumers, depending upon individual preferences. Nicotine reward is particularly complex as it results from both the amount of and speed with which nicotine is absorbed from the lining of the mouth, this is typically nicotine in the vapor phase, and from the amount and speed nicotine that is absorbed from the lungs, this is typically nicotine in the particulate phase of the aerosol which is inhaled. Each of these factors, and their balance, can strongly contribute to consumer acceptability of an e-cigarette. Providing means to optimize the overall vaping experience is therefore desirable to e-cigarette manufacturers.

A further challenge facing such systems is the continued demand for harm reduction. Harm from cigarette and e-cigarette devices primarily comes from toxicants. Therefore, there is a desire to reduce or remove the components which may form toxicants.

SUMMARY OF THE INVENTION

In one aspect there is provided an aerosolizable formulation comprising
(i) water
(ii) nicotine;
(iii) at least one acid; and
(iv) one or more flavors; and
(v) one or more encapsulating materials, wherein the encapsulating material encapsulates at least one of the one or more flavors in preference to protonated nicotine;
wherein the molar ratio of (a) encapsulating material encapsulating the one or more flavors to (b) unencapsulated flavors is greater than the
molar ratio of (c) encapsulating material encapsulating nicotine to (d) unencapsulated nicotine.

In one aspect there is provided a process for forming an aerosolizable formulation comprising
(i) water
(ii) nicotine;
(iii) at least one acid; and
(iv) one or more flavors; and
(v) one or more encapsulating materials;
the process comprising the steps of:
(a) contacting nicotine with at least one acid to partially or completely protonate the nicotine;
(b) contacting the partially or completely protonated nicotine with water, one or more flavors and the one or more encapsulating materials;
wherein the encapsulating material encapsulates at least one of the one or more flavors in preference to protonated nicotine.

In one aspect there is provided a contained aerosolizable formulation comprising
(a) a container; and
(b) an aerosolizable formulation, comprising
(i) water
(ii) nicotine;
(iii) at least one acid; and
(iv) one or more flavors; and
(v) one or more encapsulating materials, wherein the encapsulating material encapsulates at least one of the one or more flavors in preference to protonated nicotine;
wherein the molar ratio of (a) encapsulating material encapsulating the one or more flavors to (b) unencapsulated flavors is greater than the molar ratio of (c) encapsulating material encapsulating nicotine to (d) unencapsulated nicotine.

In one aspect there is provided an electronic aerosol provision system comprising:
(a) an aerosolizer for aerosolizing formulation for inhalation by a user of the electronic aerosol provision system;
(b) a power supply comprising a cell or battery for supplying power to the aerosolizer
(c) an aerosolizable formulation, comprising
(i) water
(ii) nicotine;
(iii) at least one acid; and
(iv) one or more flavors; and
(v) one or more encapsulating materials, wherein the encapsulating material encapsulates at least one of the one or more flavors in preference to protonated nicotine;
wherein the molar ratio of (a) encapsulating material encapsulating the one or more flavors to (b) unencapsulated flavors is greater than the molar ratio of (c) encapsulating material encapsulating nicotine to (d) unencapsulated nicotine.

BRIEF DESCRIPTION OF THE DRAWINGS

The present invention will now be described in further detail by way of example only with reference to the accompanying figures in which:—

DETAILED DESCRIPTION

As discussed herein in one aspect there is provided an aerosolizable formulation comprising
(i) water
(ii) nicotine;
(iii) at least one acid; and
(iv) one or more flavors; and
(v) one or more encapsulating materials, wherein the encapsulating material encapsulates at least one of the one or more flavors in preference to prot present in an amount of from 65 to 99 wt. % based on the aerosolizable formulation. In one aspect water is present in an amount of from 70 to 99 wt. % based on the aerosolizable formulation. In one aspect water is present in an amount of from 75 to 99 wt. % based on the aerosolizable formulation. In one aspect water is present in an amount of from 80 to 99 wt. % based on the aerosolizable formulation. In one aspect water is present in an amount of from 85 to 99 wt. % based on the aerosolizable formulation. In one aspect water is present in an amount of from 90 to 99 wt. % based on the aerosolizable formulation. In one aspect water is present in an amount of from 95 to 99 wt. % based on the aerosolizable formulation.

The use of water allows for the replacement of some or all of the glycerol, propylene glycol, 1,3-propane diol and mixtures thereof typically used in e-cigarettes. In one aspect the aerosolizable formulation contains glycerol, propylene glycol, 1,3-propane diol and mixtures thereof in a combined amount of no greater than 10 wt. % based on the aerosolizable formulation. In one aspect the aerosolizable formulation contains glycerol, propylene glycol, 1,3-propane diol and mixtures thereof in a combined amount of no greater than 8 wt. % based on the aerosolizable formulation. In one aspect the aerosolizable formulation contains glycerol, propylene glycol, 1,3-propane diol and mixtures thereof in a combined amount of no greater than 5 wt. % based on the aerosolizable formulation. In one aspect the aerosolizable formulation contains glycerol, propylene glycol, 1,3-propane diol and mixtures thereof in a combined amount of no greater than 2 wt. % based on the aerosolizable formulation. In one aspect the aerosolizable formulation contains glycerol, propylene glycol, 1,3-propane diol and mixtures thereof in a combined amount of no greater than 1 wt. % based on the aerosolizable formulation. In one aspect the aerosolizable formulation contains glycerol, propylene glycol, 1,3-propane diol and mixtures thereof in a combined amount of no greater than 0.5 wt. % based on the aerosolizable formulation. In one aspect the aerosolizable formulation contains glycerol, propylene glycol, 1,3-propane diol and mixtures thereof in a combined amount of no greater than 0.2 wt. % based on the aerosolizable formulation. In one aspect the aerosolizable formulation contains glycerol, propylene glycol, 1,3-propane diol and mixtures thereof in a combined amount of no greater than 0.1 wt. % based on the aerosolizable formulation. In one aspect the aerosolizable formulation contains glycerol, propylene glycol, 1,3-propane diol and mixtures thereof in a combined amount of no greater than 0.01 wt. % based on the aerosolizable formulation. In one aspect the aerosolizable formulation contains no glycerol, propylene glycol, 1,3-propane diol and mixtures thereof.

In one aspect the aerosolizable formulation contains glycerol, propylene glycol, and mixtures thereof in a combined amount of no greater than 10 wt. % based on the aerosolizable formulation. In one aspect the aerosolizable formulation contains glycerol, propylene glycol, and mixtures thereof in a combined amount of no greater than 8 wt. % based on the aerosolizable formulation. In one aspect the aerosolizable formulation contains glycerol, propylene glycol, and mixtures thereof in a combined amount of no greater than 5 wt. % based on the aerosolizable formulation. In one aspect the aerosolizable formulation contains glycerol, propylene glycol, and mixtures thereof in a combined amount of no greater than 2 wt. % based on the aerosolizable formulation. In one aspect the aerosolizable formulation contains glycerol, propylene glycol, and mixtures thereof in a combined amount of no greater than 1 wt. % based on the aerosolizable formulation. In one aspect the aerosolizable formulation contains glycerol, propylene glycol, and mixtures thereof in a combined amount of no greater than 0.5 wt. % based on the aerosolizable formulation. In one aspect the aerosolizable formulation contains glycerol, propylene glycol, and mixtures thereof in a combined amount of no greater than 0.2 wt. % based on the aerosolizable formulation. In one aspect the aerosolizable formulation contains glycerol, propylene glycol, and mixtures thereof in a combined amount of no greater than 0.1 wt. % based on the aerosolizable formulation. In one aspect the aerosolizable formulation contains glycerol, propylene glycol, and mixtures thereof in a combined amount of no greater than 0.01 wt. % based on the aerosolizable formulation. In one aspect the aerosolizable formulation contains no glycerol, propylene glycol, and mixtures thereof.

In one aspect the aerosolizable formulation contains glycerol in an amount of no greater than 10 wt. % based on the aerosolizable formulation. In one aspect the aerosolizable formulation contains glycerol in an amount of no greater than 8 wt. % based on the aerosolizable formulation. In one aspect the aerosolizable formulation contains glycerol in an amount of no greater than 5 wt. % based on the aerosolizable formulation. In one aspect the aerosolizable formulation contains glycerol in an amount of no greater than 2 wt. % based on the aerosolizable formulation. In one aspect the aerosolizable formulation contains glycerol in an amount of no greater than 1 wt. % based on the aerosolizable formulation. In one aspect the aerosolizable formulation contains glycerol in an amount of no greater than 0.5 wt. % based on the aerosolizable formulation. In one aspect the aerosolizable formulation contains glycerol in an amount of no greater than 0.2 wt. % based on the aerosolizable formulation. In one aspect the aerosolizable formulation contains glycerol in an amount of no greater than 0.1 wt. % based on the aerosolizable formulation. In one aspect the aerosolizable formulation contains glycerol in an amount of no greater than 0.01 wt. % based on the aerosolizable formulation. In one aspect the aerosolizable formulation contains no glycerol.

In one aspect the aerosolizable formulation contains propylene glycol in an amount of no greater than 10 wt. % based on the aerosolizable formulation. In one aspect the aerosolizable formulation contains propylene glycol in an amount of no greater than 8 wt. % based on the aerosolizable formulation. In one aspect the aerosolizable formulation contains propylene glycol in an amount of no greater than 5 wt. % based on the aerosolizable formulation. In one aspect the aerosolizable formulation contains propylene glycol in an amount of no greater than 2 wt. % based on the aerosolizable formulation. In one aspect the aerosolizable formulation contains propylene glycol in an amount of no greater than 1 wt. % based on the aerosolizable formulation. In one aspect the aerosolizable formulation contains propylene glycol in an amount of no greater than 0.5 wt. % based on the aerosolizable formulation. In one aspect the aerosolizable formulation contains propylene glycol in an amount of no greater than 0.2 wt. % based on the aerosolizable formulation. In one aspect the aerosolizable formulation contains propylene glycol in an amount of no greater than 0.1 wt. % based on the aerosolizable formulation. In one aspect the aerosolizable formulation contains propylene glycol in an amount of no greater than 0.01 wt. % based on the aerosolizable formulation. In one aspect the aerosolizable formulation contains no propylene glycol.

Nicotine

Nicotine formulations may be provided having desirable properties of flavor, impact, irritation, smoothness and/or nicotine reward for the user. In one aspect nicotine is present in an amount of no greater than 6 wt % based on the total weight of the aerosolizable formulation. In one aspect nicotine is present in an amount of from 0.01 to 6 wt % based on the total weight of the aerosolizable formulation. In one aspect nicotine is present in an amount of from 0.02 to 6 wt % based on the total weight of the aerosolizable formulation. In one aspect nicotine is present in an amount of from 0.05 to 6 wt % based on the total weight of the aerosolizable formulation. In one aspect nicotine is present in an amount of from 0.08 to 6 wt % based on the total weight of the aerosolizable formulation. In one aspect nicotine is present in an amount of from 0.01 to 5 wt % based on the total weight of the aerosolizable formulation. In one aspect nicotine is present in an amount of from 0.02 to 5 wt % based on the total weight of the aerosolizable formulation. In one aspect nicotine is present in an amount of from 0.05 to 5 wt % based on the total weight of the aerosolizable formulation. In one aspect nicotine is present in an amount of from 0.08 to 5 wt % based on the total weight of the aerosolizable formulation. In one aspect nicotine is present in an amount of no greater than 4 wt % based on the total weight of the aerosolizable formulation. In one aspect nicotine is present in an amount of from 0.01 to 4 wt % based on the total weight of the aerosolizable formulation. In one aspect nicotine is present in an amount of from 0.02 to 4 wt % based on the total weight of the aerosolizable formulation. In one aspect nicotine is present in an amount of from 0.05 to 4 wt % based on the total weight of the aerosolizable formulation. In one aspect nicotine is present in an amount of from 0.08 to 4 wt % based on the total weight of the aerosolizable formulation. In one aspect nicotine is present in an amount of no greater than 3 wt % based on the total weight of the aerosolizable formulation. In one aspect nicotine is present in an amount of from 0.01 to 3 wt % based on the total weight of the aerosolizable formulation. In one aspect nicotine is present in an amount of from 0.02 to 3 wt % based on the total weight of the aerosolizable formulation. In one aspect nicotine is present in an amount of from 0.05 to 3 wt % based on the total weight of the aerosolizable formulation. In one aspect nicotine is present in an amount of from 0.08 to 3 wt % based on the total weight of the aerosolizable formulation. In one aspect nicotine is present in an amount of no greater than 2 wt % based on the total weight of the aerosolizable formulation. In one aspect nicotine is present in an amount of from 0.01 to 2 wt % based on the total weight of the aerosolizable formulation. In one aspect nicotine is present in an amount of from 0.02 to 2 wt % based on the total weight of the aerosolizable formulation. In one aspect nicotine is present in an amount of from 0.05 to 2 wt % based on the total weight of the aerosolizable formulation. In one aspect nicotine is present in an amount of from 0.08 to 2 wt % based on the total weight of the aerosolizable formulation. In one aspect nicotine is present in an amount of no greater than 1 wt % based on the total weight of the aerosolizable formulation. In one aspect nicotine is present in an amount of from 0.01 to 1 wt % based on the total weight of the aerosolizable formulation. In one aspect nicotine is present in an amount of from 0.02 to 1 wt % based on the total weight of the aerosolizable formulation. In one aspect nicotine is present in an amount of from 0.05 to 1 wt % based on the total weight of the aerosolizable formulation. In one aspect nicotine is present in an amount of from 0.08 to 1 wt % based on the total weight of the aerosolizable formulation. In one aspect nicotine is present in an amount of from 0.1 to 1 wt % based on the total weight of the aerosolizable formulation. In one aspect nicotine is present in an amount of no greater than 0.6 wt % based on the total weight of the aerosolizable formulation. In one aspect nicotine is present in an amount of from 0.01 to 0.6 wt % based on the total weight of the aerosolizable formulation. In one aspect nicotine is present in an amount of from 0.02 to 0.6 wt % based on the total weight of the aerosolizable formulation. In one aspect nicotine is present in an amount of from 0.05 to 0.6 wt % based on the total weight of the aerosolizable formulation. In one aspect nicotine is present in an amount of from 0.08 to 0.6 wt % based on the total weight of the aerosolizable formulation. In one aspect nicotine is present in an amount of from 0.1 to 0.6 wt % based on the total weight of the aerosolizable formulation. In one aspect nicotine is present in an amount of no greater than 0.5 wt % based on the total weight of the aerosolizable formulation. In one aspect nicotine is present in an amount of from 0.01 to 0.5 wt % based on the total weight of the aerosolizable formulation. In one aspect nicotine is present in an amount of from 0.02 to 0.5 wt % based on the total weight of the aerosolizable formulation. In one aspect nicotine is present in an amount of from 0.05 to 0.5 wt % based on the total weight of the aerosolizable formulation. In one aspect nicotine is present in an amount of from 0.08 to 0.5 wt % based on the total weight of the aerosolizable formulation. In one aspect nicotine is present in an amount of no greater than 0.2 wt % based on the total weight of the aerosolizable formulation. In one aspect nicotine is present in an amount of from 0.01 to 0.2 wt % based on the total weight of the aerosolizable formulation. In one aspect nicotine is present in an amount of from 0.02 to 0.2 wt % based on the total weight of the aerosolizable formulation. In one aspect nicotine is present in an amount of from 0.05 to 0.2 wt % based on the total weight of the aerosolizable formulation. In one aspect nicotine is present in an amount of from 0.08 to 0.2 wt % based on the total weight of the aerosolizable formulation. In one aspect nicotine is present in an amount of no greater than 0.1 wt % based on the total weight of the aerosolizable formulation. In one aspect nicotine is present in an amount of from 0.01 to 0.1 wt % based on the total weight of the aerosolizable formulation. In one aspect nicotine is present in an amount of from 0.02 to 0.1 wt % based on the total weight of the aerosolizable formulation. In one aspect nicotine is present in an amount of from 0.05 to 0.1 wt % based on the total weight of the aerosolizable formulation. In one aspect nicotine is present in an amount of from 0.08 to 0.1 wt % based on the total weight of the aerosolizable formulation.

The formulation comprises nicotine in protonated form. The formulation may comprise nicotine in unprotonated form. In one aspect the formulation comprises nicotine in unprotonated form and nicotine in monoprotonated form. In one aspect the formulation comprises nicotine in unprotonated form and nicotine in diprotonated form. In one aspect the formulation comprises nicotine in unprotonated form, nicotine in monoprotonated form and nicotine in diprotonated form.

In one aspect at least 5 wt % of the nicotine present in the formulation is in protonated form. In one aspect at least 10 wt % of the nicotine present in the formulation is in protonated form. In one aspect at least 15 wt % of the nicotine present in the formulation is in protonated form. In one aspect at least 20 wt % of the nicotine present in the formulation is in protonated form. In one aspect at least 25 wt % of the nicotine present in the formulation is in protonated form. In one aspect at least 30 wt % of the nicotine present in the formulation is in protonated form. In one aspect at least 35 wt % of the nicotine present in the formulation is in protonated form. In one aspect at least 40 wt % of the nicotine present in the formulation is in protonated form. In one aspect at least 45 wt % of the nicotine present in the formulation is in protonated form. In one aspect at least 50 wt % of the nicotine present in the formulation is in protonated form. In one aspect at least 55 wt % of the nicotine present in the formulation is in protonated form. In one aspect at least 60 wt % of the nicotine present in the formulation is in protonated form. In one aspect at least 65 wt % of the nicotine present in the formulation is in protonated form. In one aspect at least 70 wt % of the nicotine present in the formulation is in protonated form. In one aspect at least 75 wt % of the nicotine present in the formulation is in protonated form. In one aspect at least 80 wt % of the nicotine present in the formulation is in protonated form. In one aspect at least 85 wt % of the nicotine present in the formulation is in protonated form. In one aspect at least 90 wt % of the protonated form. In one aspect from 90 to 99 wt % of the nicotine present in the formulation is in protonated form.

The relevant amounts of nicotine which are present in the formulation in protonated form are specified herein. These amounts may be readily calculated by one skilled in the art. Nicotine, 3-(1-methylpyrrolidin-2-yl) pyridine, is a diprotic base with pKa of 3.12 for the pyridine ring and 8.02 for the pyrrolidine ring It can exist in pH-dependent protonated (mono- and di-) and non-protonated (free base) forms which have different bioavailability.

The distribution of protonated and non-protonated nicotine will vary at various pH increments.

nicotine present in the formulation is in protonated form. In one aspect at least 95 wt % of the nicotine present in the formulation is in protonated form. In one aspect at least 99 wt % of the nicotine present in the formulation is in protonated form. In one aspect at least 99.9 wt % of the nicotine present in the formulation is in protonated form.

In one aspect from 50 to 95 wt % of the nicotine present in the formulation is in protonated form. In one aspect from 55 to 95 wt % of the nicotine present in the formulation is in protonated form. In one aspect from 60 to 95 wt % of the nicotine present in the formulation is in protonated form. In one aspect from 65 to 95 wt % of the nicotine present in the formulation is in protonated form. In one aspect from 70 to 95 wt % of the nicotine present in the formulation is in protonated form. In one aspect from 75 to 95 wt % of the nicotine present in the formulation is in protonated form. In one aspect from 80 to 95 wt % of the nicotine present in the formulation is in protonated form. In one aspect from 85 to 95 wt % of the nicotine present in the formulation is in protonated form. In one aspect from 90 to 95 wt % of the nicotine present in the formulation is in protonated form.

In one aspect from 50 to 99 wt % of the nicotine present in the formulation is in protonated form. In one aspect from 55 to 99 wt % of the nicotine present in the formulation is in protonated form. In one aspect from 60 to 99 wt % of the nicotine present in the formulation is in protonated form. In one aspect from 65 to 99 wt % of the nicotine present in the formulation is in protonated form. In one aspect from 70 to 99 wt % of the nicotine present in the formulation is in protonated form. In one aspect from 75 to 99 wt % of the nicotine present in the formulation is in protonated form. In one aspect from 80 to 99 wt % of the nicotine present in the formulation is in protonated form. In one aspect from 85 to 99 wt % of the nicotine present in the formulation is in The fraction of non-protonated nicotine will be predominant at high pH levels whilst a decrease in the pH will see an increase of the fraction of protonated nicotine (mono- or di-depending on the pH). If the relative fraction of protonated nicotine and the total amount of nicotine in the sample are known, the absolute amount of protonated nicotine can be calculated.

The relative fraction of protonated nicotine in formulation can be calculated by using the Henderson-Hasselbalch equation, which describes the pH as a derivation of the acid dissociation constant equation, and it is extensively employed in chemical and biological systems. Consider the following equilibrium:

$$B + H^+ \rightleftarrows BH^+$$

The Henderson-Hasselbalch equation for this equilibrium is:

$$\mathrm{pH} = pKa + \log\frac{[B]}{[BH+]}$$

Where [B] is the amount of non-protonated nicotine (i.e. free base), [BH+] the amount of protonated nicotine (i.e. conjugate acid) and pKa is the reference pKa value for the pyrrolidine ring nitrogen of nicotine (pKa=8.02). The relative fraction of protonated nicotine can be derived from the alpha value of the non-protonated nicotine calculated from the Henderson-Hasselbalch equation as:

$$\% \text{ protonated nicotine} = 100 - \left\{ \frac{\frac{[B]}{[BH+]}}{\left\{1 + \frac{[B]}{[BH+]}\right\}} * 100 \right\}$$

Determination of pKa values of nicotine formulations was carried out using the basic approach described in "Spectroscopic investigations into the acid-base properties of nicotine at different temperatures", Peter M. Clayton, Carl A. Vas, Tam T. T. Bui, Alex F. Drake and Kevin McAdam, Anal. Methods, 2013, 5, 81-88.

Acid

In one aspect the acid is an organic acid. In one aspect the acid is a carboxylic acid. In one aspect the acid is an organic carboxylic acid.

In one aspect the acid is selected from the group consisting of acetic acid, lactic acid, formic acid, citric acid, benzoic acid, pyruvic acid, levulinic acid, succinic acid, tartaric acid, sorbic acid, propionic acid, phenylacetic acid, and mixtures thereof. In one aspect the acid is selected from the group consisting of citric acid, benzoic acid, levulinic acid, lactic acid, sorbic acid, and mixtures thereof. In one aspect the acid is selected from the group consisting of citric acid, benzoic acid, levulinic acid, and mixtures thereof. In one aspect the acid is at least citric acid.

In one aspect the acid consists of citric acid.

In one aspect the acid is selected from acids having a pKa of from 2 to 5. In one aspect the acid is a weak acid. In one aspect the acid is a weak organic acid.

In one aspect the acid has a solubility in water of at least 2 g/L at 20° C. In one aspect the acid has a solubility in water of at least 5 g/L at 20° C. In one aspect the acid has a solubility in water of at least 10 g/L at 20° C. In one aspect the acid has a solubility in water of at least 20 g/L at 20° C. In one aspect the acid has a solubility in water of at least 50 g/L at 20° C. In one aspect the acid has a solubility in water of at least 100 g/L at 20° C. In one aspect the acid has a solubility in water of at least 200 g/L at 20° C. In one aspect the acid has a solubility in water of at least 300 g/L at 20° C. In one aspect the acid has a solubility in water of at least 400 g/L at 20° C. In one aspect the acid has a solubility in water of at least 500 g/L at 20° C. In one aspect the acid has a solubility in water of at least 600 g/L at 20° C. In one aspect the acid has a solubility in water of at least 700 g/L at 20° C. In one aspect the acid has a solubility in water of at least 800 g/L at 20° C. In one aspect the acid has a solubility in water of at least 900 g/L at 20° C. In one aspect the acid has a solubility in water of at least 1000 g/L at 20° C. In one aspect the acid has a solubility in water of at least 1100 g/L at 20° C.

The molar ratio of acid to nicotine may be selected as desired. In one aspect the molar ratio of acid to nicotine is from 5:1 to 1:5. In one aspect the molar ratio of acid to nicotine is from 4:1 to 1:4. In one aspect the molar ratio of acid to nicotine is from 3:1 to 1:3. In one aspect the molar ratio of acid to nicotine is from 2:1 to 1:2. In one aspect the molar ratio of acid to nicotine is from 1.5:1 to 1:1.5. In one aspect the molar ratio of acid to nicotine is from 1.2:1 to 1:1.2. In one aspect the molar ratio of acid to nicotine is from 5:1 to 1:1. In one aspect the molar ratio of acid to nicotine is from 4:1 to 1:1. In one aspect the molar ratio of acid to nicotine is from 3:1 to 1:1. In one aspect the molar ratio of acid to nicotine is from 2:1 to 1:1. In one aspect the molar ratio of acid to nicotine is from 1.5:1 to 1:1. In one aspect the molar ratio of acid to nicotine is from 1.2:1 to 1:1.

In one aspect the total content of acid present in the formulation is no greater than 5 mole equivalents based on the nicotine. In one aspect the total content of acid present in the formulation is no greater than 4 mole equivalents based on the nicotine. In one aspect the total content of acid present in the formulation is no greater than 3 mole equivalents based on the nicotine. In one aspect the total content of acid present in the formulation is no greater than 2 mole equivalents based on the nicotine. In one aspect the total content of acid present in the formulation is no greater than 1 mole equivalents based on the nicotine.

In one aspect the total content of acid present in the formulation is no less than 0.01 mole equivalents based on the nicotine. In one aspect the total content of acid present in the formulation is no less than 0.05 mole equivalents based on the nicotine. In one aspect the total content of acid present in the formulation is no less than 0.1 mole equivalents based on the nicotine. In one aspect the total content of acid present in the formulation is no less than 0.2 mole equivalents based on the nicotine. In one aspect the total content of acid present in the formulation is no less than 0.3 mole equivalents based on the nicotine. In one aspect the total content of acid present in the formulation is no less than 0.4 mole equivalents based on the nicotine. In one aspect the total content of acid present in the formulation is no less than 0.5 mole equivalents based on the nicotine. In one aspect the total content of acid present in the formulation is no less than 0.7 mole equivalents based on the nicotine.

The acid may be present in any suitable amount. In one aspect the acid is present in an amount of no greater than 6 wt % based on the aerosolizable formulation. In one aspect the acid is present in an amount of from 0.01 to 6 wt % based on the aerosolizable formulation. In one aspect the acid is present in an amount of from 0.02 to 6 wt % based on the aerosolizable formulation. In one aspect the acid is present in an amount of from 0.05 to 6 wt % based on the aerosolizable formulation. In one aspect the acid is present in an amount of from 0.08 to 6 wt % based on the aerosolizable formulation. In one aspect the acid is present in an amount of from 0.01 to 5 wt % based on the aerosolizable formulation. In one aspect the acid is present in an amount of from 0.02 to 5 wt % based on the aerosolizable formulation. In one aspect the acid is present in an amount of from 0.05 to 5 wt % based on the aerosolizable formulation. In one aspect the acid is present in an amount of from 0.08 to 5 wt % based on the aerosolizable formulation. In one aspect the acid is present in an amount of no greater than 4 wt % based on the aerosolizable formulation. In one aspect the acid is present in an amount of from 0.01 to 4 wt % based on the aerosolizable formulation. In one aspect the acid is present in an amount of from 0.02 to 4 wt % based on the aerosolizable formulation. In one aspect the acid is present in an amount of from 0.05 to 4 wt % based on the aerosolizable formulation. In one aspect the acid is present in an amount of from 0.08 to 4 wt % based on the aerosolizable formulation. In one aspect the acid is present in an amount of no greater than 3 wt % based on the aerosolizable formulation. In one aspect the acid is present in an amount of from 0.01 to 3 wt % based on the aerosolizable formulation. In one aspect the acid is present in an amount of from 0.02 to 3 wt % based on the aerosolizable formulation. In one aspect the acid is present in an amount of from 0.05 to 3 wt % based on the aerosolizable formulation. In one aspect the acid is present in an amount of from 0.08 to 3 wt % based on the aerosolizable formulation. In one aspect the acid is present in an amount of no greater than 2 wt % based on the aerosolizable formulation. In one aspect the acid is present in an amount of from 0.01 to 2 wt % based on the aerosolizable formulation. In one aspect the acid is present in an amount of from 0.02 to 2 wt % based on the aerosolizable formulation. In one aspect the acid is present in an amount of from 0.05 to 2 wt % based on the aerosolizable formulation. In one aspect the acid is present in an amount of from 0.08 to 2 wt % based on the aerosolizable formulation. In one aspect the acid is present in an amount of no greater than 1 wt % based on the aerosolizable formulation. In one aspect the acid is present in an amount of from 0.01 to 1 wt % based on the aerosolizable formulation. In one aspect the acid is present in an amount of from 0.02 to 1 wt % based on the aerosolizable formulation. In one aspect the acid is present in an amount of from 0.05 to 1 wt % based on the aerosolizable formulation. In one aspect the acid is present in an amount of from 0.08 to 1 wt % based on the aerosolizable formulation. In one aspect the acid is present in an amount of from 0.1 to 1 wt % based on the aerosolizable formulation. In one aspect the acid is present in an amount of no greater than 0.6 wt % based on the aerosolizable formulation. In one aspect the acid is present in an amount of from 0.01 to 0.6 wt % based on the aerosolizable formulation. In one aspect the acid is present in an amount of from 0.02 to 0.6 wt % based on the aerosolizable formulation. In one aspect the acid is present in an amount of from 0.05 to 0.6 wt % based on the aerosolizable formulation. In one aspect the acid is present in an amount of from 0.08 to 0.6 wt % based on the aerosolizable formulation. In one aspect the acid is present in an amount of from 0.1 to 0.6 wt % based on the aerosolizable formulation. In one aspect the acid is present in an amount of no greater than 0.5 wt % based on the aerosolizable formulation.

In one aspect the acid is present in an amount of from 0.01 to 0.5 wt % based on the aerosolizable formulation. In one aspect the acid is present in an amount of from 0.02 to 0.5 wt % based on the aerosolizable formulation. In one aspect the acid is present in an amount of from 0.05 to 0.5 wt % based on the aerosolizable formulation. In one aspect the acid is present in an amount of from 0.08 to 0.5 wt % based on the aerosolizable formulation. In one aspect the acid is present in an amount of no greater than 0.2 wt % based on the aerosolizable formulation. In one aspect the acid is present in an amount of from 0.01 to 0.2 wt % based on the aerosolizable formulation. In one aspect the acid is present in an amount of from 0.02 to 0.2 wt % based on the aerosolizable formulation. In one aspect the acid is present in an amount of from 0.05 to 0.2 wt % based on the aerosolizable formulation. In one aspect the acid is present in an amount of from 0.08 to 0.2 wt % based on the aerosolizable formulation. In one aspect the acid is present in an amount of no greater than 0.1 wt % based on the aerosolizable formulation. In one aspect the acid is present in an amount of from 0.01 to 0.1 wt % based on the aerosolizable formulation. In one aspect the acid is present in an amount of from 0.02 to 0.1 wt % based on the aerosolizable formulation. In one aspect the acid is present in an amount of from 0.05 to 0.1 wt % based on the aerosolizable formulation. In one aspect the acid is present in an amount of from 0.08 to 0.1 wt % based on the aerosolizable formulation.

The amount of acid and the solubility of the acid may be selected such that a given amount of the acid will dissolve in the water. In one aspect at 20° C. at least 20% of the acid dissolves in the water. In one aspect at 25° C. at least 20% of the acid dissolves in the water. In one aspect at 30° C. at least 20% of the acid dissolves in the water. In one aspect at 20° C. at least 35% of the acid dissolves in the water. In one aspect at 20° C. at least 40% of the acid dissolves in the water. In one aspect at 20° C. at least 45% of the acid dissolves in the water. In one aspect at 20° C. at least 50% of the acid dissolves in the water. In one aspect at 20° C. at least 55% of the acid dissolves in the water.

Flavor

The aerosolizable formulation comprises one or more flavors or flavoringing components. As used herein, the terms "flavor" and "flavorantant" refer to materials which, where local regulations permit, may be used to create a desired taste or aroma in a product for adult consumers. They may include extracts (e.g. liquorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder. The one or more flavors may be selected from the group consisting of (4-(para-)methoxyphenyl)-2-butanone, vanillin, γ-undecalactone, menthone, 5-propenyl guaethol, menthol, para-mentha-8-thiol-3-one and mixtures thereof. In one aspect the flavor is at least menthol.

If present, the one or more flavors may be present in any suitable amount. In one aspect the one or more flavors are present in a total amount of no greater than 10 wt. % based on the aerosolizable formulation. In one aspect the one or more flavors are present in a total amount of no greater than 7 wt. % based on the aerosolizable formulation. In one aspect the one or more flavors are present in a total amount of no greater than 5 wt. % based on the aerosolizable formulation. In one aspect the one or more flavors are present in a total amount of no greater than 4 wt. % based on the aerosolizable formulation. In one aspect the one or more flavors are present in a total amount of no greater than 3 wt. % based on the aerosolizable formulation. In one aspect the one or more flavors are present in a total amount of no greater than 2 wt. % based on the aerosolizable formulation. In one aspect the one or more flavors are present in a total amount of no greater than 1 wt. % based on the aerosolizable formulation.

In one aspect the one or more flavors are present in a total amount of from 0.01 to 5 wt. % based on the aerosolizable formulation. In one aspect the one or more flavors are present in a total amount of from 0.01 to 4 wt. % based on the aerosolizable formulation. In one aspect the one or more flavors are present in a total amount of from 0.01 to 3 wt. % based on the aerosolizable formulation. In one aspect the one or more flavors are present in a total amount of from 0.01 to 2 wt. % based on the aerosolizable formulation. In one aspect the one or more flavors are present in a total amount of from 0.01 to 1 wt. % based on the aerosolizable formulation. In one aspect the one or more flavors are present in a total amount of from 0.01 to 0.5 wt. % based on the aerosolizable formulation.

Encapsulating Material

The aerosolizable formulation comprises one or more encapsulating materials. The one or more encapsulating materials may be present in any suitable amount in the aerosolizable formulation. In one aspect the one or more encapsulating materials are present in a total amount of no greater than 20 wt. % based on the aerosolizable formulation. In one aspect the one or more encapsulating materials are present in a total amount of no greater than 15 wt. % based on the aerosolizable formulation. In one aspect the one or more encapsulating materials are present in a total amount of no greater than 12 wt. % based on the aerosolizable formulation. In one aspect the one or more encapsulating materials are present in a total amount of no greater than 10 wt. % based on the aerosolizable formulation. In one aspect the one or more encapsulating materials are present in a total amount of no greater than 9 wt. % based on the aerosolizable formulation. In one aspect the one or more encapsulating materials are present in a total amount of no greater than 8 wt. % based on the aerosolizable formulation. In one aspect the one or more encapsulating materials are present in a total amount of no greater than 7 wt. % based on the aerosolizable formulation. In one aspect the one or more encapsulating materials are present in a total amount of no greater than 6 wt. % based on the aerosolizable formulation. In one aspect the one or more encapsulating materials are present in a total amount of no greater than 5 wt. % based on the aerosolizable formulation. In one aspect the one or more encapsulating materials are present in a total amount of no greater than 4 wt. % based on the aerosolizable formulation. In one aspect the one or more encapsulating materials are present in a total amount of no greater than 3 wt. % based on the aerosolizable formulation. In one aspect the one or more encapsulating materials are present in a total amount of no greater than 2 wt. % based on the aerosolizable formulation. In one aspect the one or more encapsulating materials are present in a total amount of no greater than 1 wt. % based on the aerosolizable formulation. In one aspect the one or more encapsulating materials are present in a total amount of no greater than 0.1 wt. % based on the aerosolizable formulation. In one aspect the one or more encapsulating materials are present in a total amount of no greater than 0.01 wt. % based on the aerosolizable formulation. In one aspect the one or more encapsulating materials are present in a total amount of no greater than 0.001 wt. % based on the aerosolizable formulation.

In one aspect the one or more encapsulating materials are present in a total amount of from 1 to 20 wt. % based on the aerosolizable formulation. In one aspect the one or more encapsulating materials are present in a total amount of from 1 to 15 wt. % based on the aerosolizable formulation. In one aspect the one or more encapsulating materials are present in a total amount of from 1 to 12 wt. % based on the aerosolizable formulation. In one aspect the one or more encapsulating materials are present in a total amount of from 2 to 12 wt. % based on the aerosolizable formulation. In one aspect the one or more encapsulating materials are present in a total amount of from 3 to 12 wt. % based on the aerosolizable formulation. In one aspect the one or more encapsulating materials are present in a total amount of from 4 to 12 wt. % based on the aerosolizable formulation. In one aspect the one or more encapsulating materials are present in a total amount of from 5 to 12 wt. % based on the aerosolizable formulation. In one aspect the one or more encapsulating materials are present in a total amount of from 6 to 12 wt. % based on the aerosolizable formulation. In one aspect the one or more encapsulating materials are present in a total amount of from 7 to 12 wt. % based on the aerosolizable formulation. In one aspect the one or more encapsulating materials are present in a total amount of from 6 to 11 wt. % based on the aerosolizable formulation. In one aspect the one or more encapsulating materials are present in a total amount of from 7 to 11 wt. % based on the aerosolizable formulation. In one aspect the one or more encapsulating materials are present in a total amount of from 7 to 10 wt. % based on the aerosolizable formulation. In one aspect the one or more encapsulating materials are present in a total amount of from 8 to 11 wt. % based on the aerosolizable formulation. In one aspect the one or more encapsulating materials are present in a total amount of from 8 to 10 wt. % based on the aerosolizable formulation.

In one aspect the one or more encapsulating materials is selected from the group consisting of micelles, cyclodextrins, calixarenes, metal organic frameworks, dendrimers, polymers, hydrocolloids, pollen spores, yeast particles, porous silica, and mixtures thereof.

In one aspect the one or more encapsulating materials are selected from cyclodextrins and mixtures thereof. In one aspect there is provided an aerosolizable formulation comprising (i) water (ii) nicotine; (iii) at least one acid; and (iv) one or more flavors; and (v) one or more cyclodextrins, wherein the one or more cyclodextrin interact with the at least one of the one or more flavors in preference to protonated nicotine;

wherein the molar ratio of (a) cyclodextrin associated with flavors to (b) flavors not associated with cyclodextrin, is greater than the molar ratio of (c) cyclodextrin associated with nicotine to (d) nicotine not associated with cyclodextrin.

The one or more cyclodextrins may be selected from the group consisting of unsubstituted cyclodextrins, substituted cyclodextrins and mixtures thereof. In one aspect at least one cyclodextrin is an unsubstituted cyclodextrin. In one aspect the one or more cyclodextrins are selected from the group consisting of unsubstituted cyclodextrins. In one aspect at least one cyclodextrin is a substituted cyclodextrin. In one aspect the one or more cyclodextrins are selected from the group consisting of substituted cyclodextrins.

In one aspect the one or more cyclodextrins are selected from the group consisting of unsubstituted ($\alpha$)-cyclodextrin, substituted ($\alpha$)-cyclodextrin, unsubstituted ($\beta$)-cyclodextrin, substituted ($\beta$)-cyclodextrin, unsubstituted ($\gamma$)-cyclodextrin, substituted ($\gamma$)-cyclodextrin, and mixtures thereof. In one aspect the one or more cyclodextrins are selected from the group consisting of unsubstituted ($\beta$)-cyclodextrin, substituted ($\beta$)-cyclodextrin, and mixtures thereof.

In one aspect the one or more cyclodextrins are selected from the group consisting of unsubstituted ($\alpha$)-cyclodextrin, unsubstituted ($\beta$)-cyclodextrin, unsubstituted ($\gamma$)-cyclodextrin, and mixtures thereof. In one aspect the one or more cyclodextrins is selected from unsubstituted ($\beta$)-cyclodextrin.

In one aspect the one or more cyclodextrins are selected from the group consisting of substituted ($\alpha$)-cyclodextrin, substituted ($\beta$)-cyclodextrin, substituted ($\gamma$)-cyclodextrin, and mixtures thereof. In one aspect the one or more cyclodextrins is selected from substituted ($\beta$)-cyclodextrins. Chemical substitutions at the 2-, 3-, and 6-hydroxyl sites are envisaged, and in particular substitution at the 2-position.

In one aspect the one or more cyclodextrins are selected from the group consisting of 2-hydroxy-propyl-$\alpha$-cyclodextrin, 2-hydroxy-propyl-$\beta$-cyclodextrin, 2-hydroxy-propyl-$\gamma$- cyclodextrin and mixtures thereof. In one aspect the one or more cyclodextrins is at least 2-hydroxy-propyl-α-cyclodextrin. In one aspect the one or more cyclodextrins is at least 2-hydroxy-propyl-β-cyclodextrin. In one aspect the one or more cyclodextrins is at least 2-hydroxy-propyl-γ-cyclodextrin.

2-hydroxy-propyl derivatives of cyclodextrins, such as 2-hydroxy-propyl-β-cyclodextrin have increased solubility in water when compared to base cyclodextrins such as β-cyclodextrin.

One or more cyclodextrins may or may not be present in any suitable amount in the aerosolizable formulation. In one aspect the one or more cyclodextrins are present in a total amount of no greater than 20 wt. % based on the aerosolizable formulation. In one aspect the one or more cyclodextrins are present in a total amount of no greater than 15 wt. % based on the aerosolizable formulation. In one aspect the one or more cyclodextrins are present in a total amount of no greater than 12 wt. % based on the aerosolizable formulation. In one aspect the one or more cyclodextrins are present in a total amount of no greater than 10 wt. % based on the aerosolizable formulation. In one aspect the one or more cyclodextrins are present in a total amount of no greater than 9 wt. % based on the aerosolizable formulation. In one aspect the one or more cyclodextrins are present in a total amount of no greater than 8 wt. % based on the aerosolizable formulation. In one aspect the one or more cyclodextrins are present in a total amount of no greater than 7 wt. % based on the aerosolizable formulation. In one aspect the one or more cyclodextrins are present in a total amount of no greater than 6 wt. % based on the aerosolizable formulation. In one aspect the one or more cyclodextrins are present in a total amount of no greater than 5 wt. % based on the aerosolizable formulation. In one aspect the one or more cyclodextrins are present in a total amount of no greater than 4 wt. % based on the aerosolizable formulation. In one aspect the one or more cyclodextrins are present in a total amount of no greater than 3 wt. % based on the aerosolizable formulation. In one aspect the one or more cyclodextrins are present in a total amount of no greater than 2 wt. % based on the aerosolizable formulation. In one aspect the one or more cyclodextrins are present in a total amount of no greater than 1 wt. % based on the aerosolizable formulation. In one aspect the one or more cyclodextrins are present in a total amount of no greater than 0.1 wt. % based on the aerosolizable formulation. In one aspect the one or more cyclodextrins are present in a total amount of no greater than 0.01 wt. % based on the aerosolizable formulation. In one aspect the one or more cyclodextrins are present in a total amount of no greater than 0.001 wt. % based on the aerosolizable formulation.

In one aspect the one or more cyclodextrins are present in a total amount of from 1 to 20 wt. % based on the aerosolizable formulation. In one aspect the one or more cyclodextrins are present in a total amount of from 1 to 15 wt. % based on the aerosolizable formulation. In one aspect the one or more cyclodextrins are present in a total amount of from 1 to 12 wt. % based on the aerosolizable formulation. In one aspect the one or more cyclodextrins are present in a total amount of from 2 to 12 wt. % based on the aerosolizable formulation. In one aspect the one or more cyclodextrins are present in a total amount of from 3 to 12 wt. % based on the aerosolizable formulation. In one aspect the one or more cyclodextrins are present in a total amount of from 4 to 12 wt. % based on the aerosolizable formulation. In one aspect the one or more cyclodextrins are present in a total amount of from 5 to 12 wt. % based on the aerosolizable formulation. In one aspect the one or more cyclodextrins are present in a total amount of from 6 to 12 wt. % based on the aerosolizable formulation. In one aspect the one or more cyclodextrins are present in a total amount of from 7 to 12 wt. % based on the aerosolizable formulation. In one aspect the one or more cyclodextrins are present in a total amount of from 6 to 11 wt. % based on the aerosolizable formulation. In one aspect the one or more cyclodextrins are present in a total amount of from 7 to 11 wt. % based on the aerosolizable formulation. In one aspect the one or more cyclodextrins are present in a total amount of from 7 to 10 wt. % based on the aerosolizable formulation. In one aspect the one or more cyclodextrins are present in a total amount of from 8 to 11 wt. % based on the aerosolizable formulation. In one aspect the one or more cyclodextrins are present in a total amount of from 8 to 10 wt. % based on the aerosolizable formulation.

Formulation

As discussed herein, the encapsulating material encapsulates at least one of the one or more flavors in preference to protonated nicotine such that the molar ratio of (a) encapsulating material encapsulating the one or more flavors to (b) unencapsulated flavors is greater than the molar ratio of (c) encapsulating material encapsulating nicotine to (d) unencapsulated nicotine. As will be understood by one skilled in the art by this it is meant that the relative amount of (a) moles encapsulating material encapsulating the one or more flavors to (b) moles unencapsulated flavors, is greater than the relative amount of (c) moles of encapsulating material encapsulating nicotine to (d) moles unencapsulated nicotine. The total moles of encapsulating material encapsulating the one or more flavors compared, to total moles of encapsulating material encapsulating nicotine, need not meet this ratio.

The molar ratio of (a) encapsulating material encapsulating the one or more flavors to (b) unencapsulated flavors is referred to herein as the molar ratio of (a) to (b). The molar ratio of (c) encapsulating material encapsulating nicotine to (d) unencapsulated nicotine is referred to herein as the molar ratio of (c) to (d). In one aspect wherein the molar ratio of (a) to (b) is at least 1.1 times the molar ratio of (c) to (d). In one aspect wherein the molar ratio of (a) to (b) is at least 1.2 times the molar ratio of (c) to (d). In one aspect wherein the molar ratio of (a) to (b) is at least 1.3 times the molar ratio of (c) to (d). In one aspect wherein the molar ratio of (a) to (b) is at least 1.4 times the molar ratio of (c) to (d). In one aspect wherein the molar ratio of (a) to (b) is at least 1.5 times the molar ratio of (c) to (d). In one aspect wherein the molar ratio of (a) to (b) is at least 1.8 times the molar ratio of (c) to (d). In one aspect wherein the molar ratio of (a) to (b) is at least 2 times the molar ratio of (c) to (d). In one aspect wherein the molar ratio of (a) to (b) is at least 2.5 times the molar ratio of (c) to (d). In one aspect wherein the molar ratio of (a) to (b) is at least 3 times the molar ratio of (c) to (d). In one aspect wherein the molar ratio of (a) to (b) is at least 4 times the molar ratio of (c) to (d). In one aspect wherein the molar ratio of (a) to (b) is at least 5 times the molar ratio of (c) to (d). In one aspect wherein the molar ratio of (a) to (b) is at least 6 times the molar ratio of (c) to (d). In one aspect wherein the molar ratio of (a) to (b) is at least 7 times the molar ratio of (c) to (d). In one aspect wherein the molar ratio of (a) to (b) is at least 8 times the molar ratio of (c) to (d). In one aspect wherein the molar ratio of (a) to (b) is at least 9 times the molar ratio of (c) to (d).

As discussed above, in the present system the number of components present may be reduced leading to less chance of forming breakdown products/toxicants. Thus in one aspect there is provided an aerosolizable formulation as described herein consisting of (i) water (ii) nicotine; (iii) at least one acid; and (iv) one or more flavors; and (v) one or more encapsulating materials, wherein the encapsulating material encapsulates at least one of the one or more flavors in preference to protonated nicotine; wherein the molar ratio of (a) encapsulating material encapsulating the one or more flavors to (b) unencapsulated flavors is greater than the molar ratio of (c) encapsulating material encapsulating nicotine to (d) unencapsulated nicotine.

Process

As discussed herein, in one aspect there is provided a process for forming an aerosolizable formulation comprising
  (i) water
  (ii) nicotine;
  (iii) at least one acid; and
  (iv) one or more flavors; and
  (v) one or more encapsulating materials;
the process comprising the steps of:
  (a) contacting nicotine with at least one acid to partially or completely protonate the nicotine;
  (b) contacting the partially or completely protonated nicotine with water, one or more flavors and the one or more encapsulating materials;
wherein the encapsulating material encapsulates at least one of the one or more flavors in preference to protonated nicotine.

In one aspect the process comprises preparing a nicotine solution comprising (ii) nicotine; (iii) at least one acid; and optionally (i) water; to partially or completely protonate the nicotine, contacting the nicotine solution with water, one or more flavors and the one or more encapsulating materials.

In one aspect the process comprises preparing a flavor solution comprising (i) water; (iv) one or more flavors; and (v) one or more encapsulating materials; contacting the partially or completely protonated nicotine with the flavor solution.

It will be appreciated by one skilled in the art that in the present process in which (i) nicotine and (ii) at least one acid are contacted to partially or completely protonate the nicotine, the combination may be isolated prior to further use or contact in the process. Thus in one aspect there is provided an intermediate product comprising (i) nicotine and (ii) at least one acid. The (i) nicotine and (ii) at least one acid may be contacted in the presence or absence of water. Water may be present to aid mixing and may then be driven off, if required. Thus there is provided an intermediate product comprising (i) nicotine, (ii) at least one acid, and (iii) water.

Similarly, it will be appreciated by one skilled in the art that in the present process in which (i) water (ii) one or more flavors; and (iii) one or more encapsulating materials are contacted the combination may be isolated prior to further use or contact in the process. Thus in one aspect there is provided an intermediate product comprising (i) water (ii) one or more flavors; and (iii) one or more encapsulating materials In one aspect there is provided a process for forming an aerosol, the process comprising aerosolizing an aerosolizable formulation comprising
  (i) water
  (ii) nicotine;
  (iii) at least one acid; and
  (iv) one or more flavors; and
  (v) one or more encapsulating materials, wherein the encapsulating material encapsulates at least one of the one or more flavors in preference to protonated nicotine;
wherein the molar ratio of (a) encapsulating material encapsulating the one or more flavors to
  (b) unencapsulated flavors is greater than the
  molar ratio of (c) encapsulating material encapsulating nicotine to (d) unencapsulated nicotine.

In the process the aerosol may be formed by a process performed at a temperature below 60° C. In the process the aerosol may be formed by a process performed at a temperature below 50° C. In the process the aerosol may be formed by a process performed at a temperature below 40° C. In the process the aerosol may be formed by a process performed at a temperature below 30° C. In the process the aerosol may be formed by a process performed at a temperature below 25° C. In the process the aerosol may be formed by a process which does not involve heating.

In the process the aerosol may be formed by applying ultrasonic energy to the aerosolizable formulation.

In one aspect the aerosol the aerosol of the aerosolized formulation has a D50 of from 2 to 6 μm. References in the present specification to particle size distribution, D50, D10 or D90 refer to values measured in accordance with British and European Pharmacopoeia, 2.9.31 Particle Size Analysis By Laser Light Diffraction (see BRITISH PHARMACOPOEIA COMMISSION. (2014), British Pharmacopoeia. London, England: Stationery Office and COUNCIL OF EUROPE. (2013). European Pharmacopoeia. Strasbourg, France: Council of Europe). The terms D50, Dv50 and Dx50 are interchangeable. The terms D10, Dv10 and Dx10 are interchangeable. The terms D90, Dv90 and Dx90 are interchangeable.

In one aspect the aerosol has a D50 of from 2.5 to 6 μm. In one aspect the aerosol has a D50 of from 3 to 6 μm. In one aspect the aerosol has a D50 of from 3.5 to 6 μm. In one aspect the aerosol has a D50 of from 4 to 6 μm. In one aspect the aerosol has a D50 of from 4.5 to 6 μm. In one aspect the aerosol has a D50 of from 5 to 6 μm. In one aspect the aerosol has a D50 of from 2.5 to 5.5 μm. In one aspect the aerosol has a D50 of from 3 to 5.5 μm. In one aspect the aerosol has a D50 of from 3.5 to 5.5 μm. In one aspect the aerosol has a D50 of from 4 to 5.5 μm. In one aspect the aerosol has a D50 of from 4.5 to 5.5 μm. In one aspect the aerosol has a D50 of from 5 to 5.5 μm.

In one aspect the aerosol has a D10 of at least 0.5 μm. In one aspect the aerosol has a D10 of at least 1 μm. In one aspect the aerosol has a D10 of at least 2 μm.

In one aspect the aerosol has a D90 of no greater than 15 μm. In one aspect the aerosol has a D90 of no greater than 12 μm. In one aspect the aerosol has a D90 of no greater than 10 μm.

In one aspect D50 is measured after exclusion of particles having a particle size of less than 1 μm. In one aspect D10 is measured after exclusion of particles having a particle size of less than 1 μm. In one aspect D90 is measured after exclusion of particles having a particle size of less than 1 μm.

The formulation may be contained or delivered by any means. In one aspect the present disclosure provides a contained aerosolizable formulation comprising (a) one or more containers; and (b) an aerosolizable formulation as defined herein. The container may be any suitable container, for example to allow for the storage or delivery of the formulation. In one aspect the container is configured for engagement with an electronic aerosol provision system. The container may be configured to become fluidly in communication with an electronic aerosol provision system so that formulation may be delivered to the electronic aerosol provision system. As described above, the present disclosure relates to container which may be used in an electronic aerosol provision system, such as an e-cigarette. Throughout the following description the term "e-cigarette" is used; however, this term may be used interchangeably with electronic aerosol provision system.

As discussed herein, the container of the present disclosure is typically provided for the delivery of aerosolizable formulation to or within an e-cigarette. The aerosolizable formulation may be held within an e-cigarette or may be sold as a separate container for subsequent use with or in an e-cigarette. As understood by one skilled in the art, e-cigarettes may contain a unit known as a detachable cartomizer which typically comprises a reservoir of aerosolizable formulation, a wick material and a heating element for vaporizing the aerosolizable formulation. In some e-cigarettes, the cartomizer is part of a single-piece device and is not detachable. In one aspect the container is a cartomizer or is part of a cartomizer. In one aspect the container is not a cartomizer or part of a cartomizer and is a container, such as a tank, which may be used to deliver nicotine formulation to or within an e-cigarette.

In one aspect the container is part of an e-cigarette. Therefore in a further aspect the present disclosure provides an electronic aerosol provision system comprising: an aerosolizable formulation as defined herein; an aerosolizer for aerosolizing formulation for inhalation by a user of the electronic aerosol provision system; and a power supply comprising a cell or battery for supplying power to the aerosolizer.

In addition to the aerosolizable formulation of the present disclosure and to systems such as containers and electronic aerosol provision systems containing the same, the present disclosure provides a process for improving the sensory properties of an aerosolized nicotine.

Reference to an improvement in the sensory properties of a vaporized nicotine solution refer may include an improvement in the smoothness of the vaporized nicotine solution as perceived by a user.

The process of the present disclosure may comprises additional steps either before the steps listed, after the steps listed or between one or more of the steps listed.

The invention will now be described with reference to the following non-limiting example.

EXAMPLES

Example 1

In practice, the amount of encapsulated flavor decreases as the nicotine content increases. The flavor loading is not sufficient at nicotine concentrations above 3.0% (w/w) in this application. Addition of weak organic acid in situ does not protonate the nicotine adequately before it forms a complex molecule with Cyclodextrin, thus, precipitation of any hydrophobic components such as flavor, is observed. A heating step is required in this case to prevent precipitate from forming.

An aqueous solution of citric acid and nicotine was prepared using a 1:1 molar equivalent ratio. The resulting liquid is bright orange and shows no signs of separation. Using a desiccator, water and any water-soluble impurities are removed from the liquid, resulting in a production of a bright orange precipitate with a gel-like consistency. This was referred to as nicotinium citrate.

The formulation can then be prepared as above, except that no heating or filtration steps are required. When the nicotinium citrate gel is added in place of nicotine in the final formulation stages, it dissociates in the corresponding nicotinium (+) and citrate (−) ions. Since nicotinium (+) is inherently larger than nicotine, (it has inherited a proton from the corresponding citrate (−) ion), it cannot interfere with the cyclodextrin complexation mechanism since hydrophobic components are now the favored guest species. This is supported by the lack of any visual precipitate.

Sensorally, the formulation is more robust when prepared in this manner. Flavor delivery is optimized and no longer tails off with increasing nicotine concentration. Nicotine delivery is also optimized because the nicotine now exists in the particulate phase rather than the vapor phase, so it can penetrate the deep lung. The presence of citrate (−) ions complements the nicotine attributes by providing an inherent bitterness and enhanced throat catch. It is feasible to further reduce the nicotine concentration because of this effect.

Example 2

The interaction between cyclodextrin and menthol and cyclodextrin and nicotine (unprotonated and monoprotonated) was assessed using NMR spectroscopy. The study was conducted on formulations containing Formulation 1-90.0% (w/w) water, 0.9% (w/w) 1-menthol, 9% (w/w) 2-hydroxy-propyl-β-cyclodextrin, and 0.1% (w/w) nicotine.

Formulation 2-89.9% (w/w) water, 0.9% (w/w) 1-menthol, 9% (w/w) 2-hydroxy-propyl-β-cyclodextrin, 0.1% (w/w) nicotine and 0.1% (w/w) citric acid.

During the NMR studies the assessment of the diffusion coefficient and subsequent residence times of monoprotonated nicotine, unprotonated nicotine, menthol within 2-hydroxy-propyl-β-cyclodextrin. The diffusion coefficient and subsequent residence times were studied as they are understood to provide a qualitative assessment of the degree of interaction of the compound with the complexing agent with each of the components studied. It is understood that encapsulation is not a static state but a dynamic one in which materials are encapsulated (e.g. complexed or bound to an encapsulating agent) for a period of time before release after which they may be subsequently encapsulated. Therefore, decreased residence time indicates decreased interaction with the complexing agent.

Diffusion-Ordered NMR Spectroscopy (DOSY) experiments were selected as suitable for assessment of diffusion times of nicotine and menthol solutions of individual constituents, in the formulation describe above and formulations with spike components to vary the ratios of constituents (nicotine: 2-hydroxy-propyl-β-cyclodextrin:menthol=1:4:1 and nicotine: 2-hydroxy-propyl-β-cyclodextrin:menthol:citric acid=1:4:1:1 molar ratios).

Figure 1:
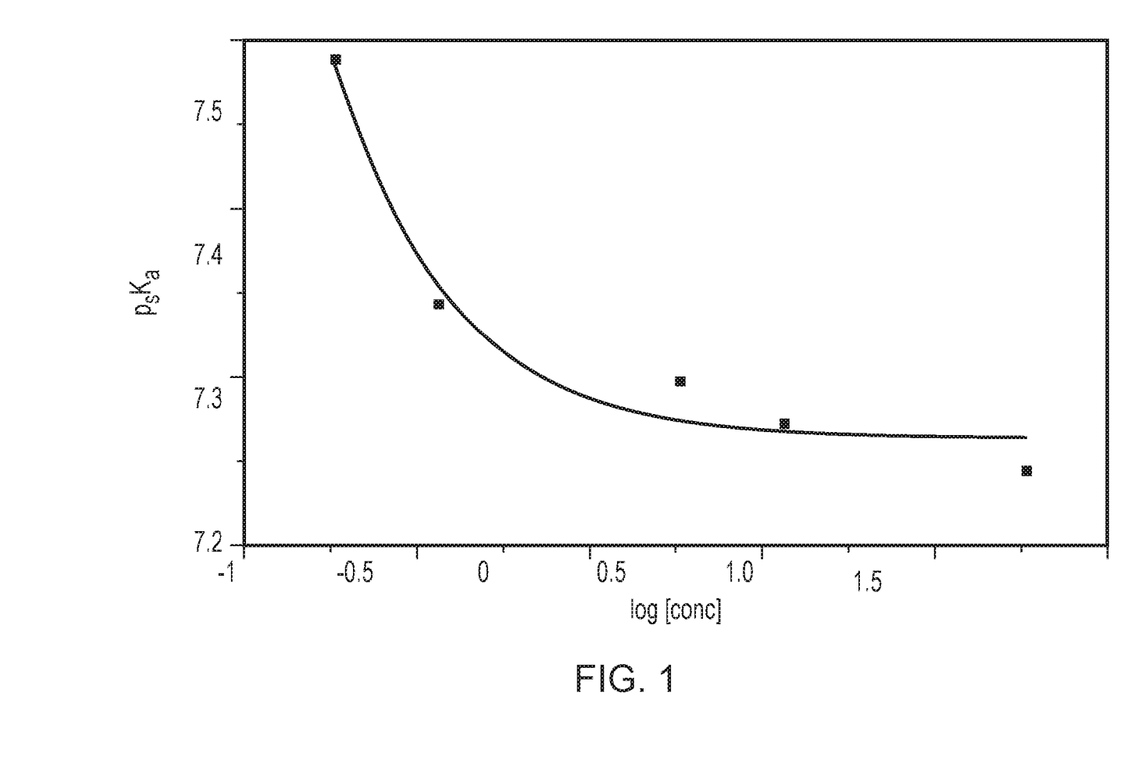
FIG. 1 shows a graph illustrating variation of $p_sK_{a2}$ with nicotine concentration.
Figure 2:
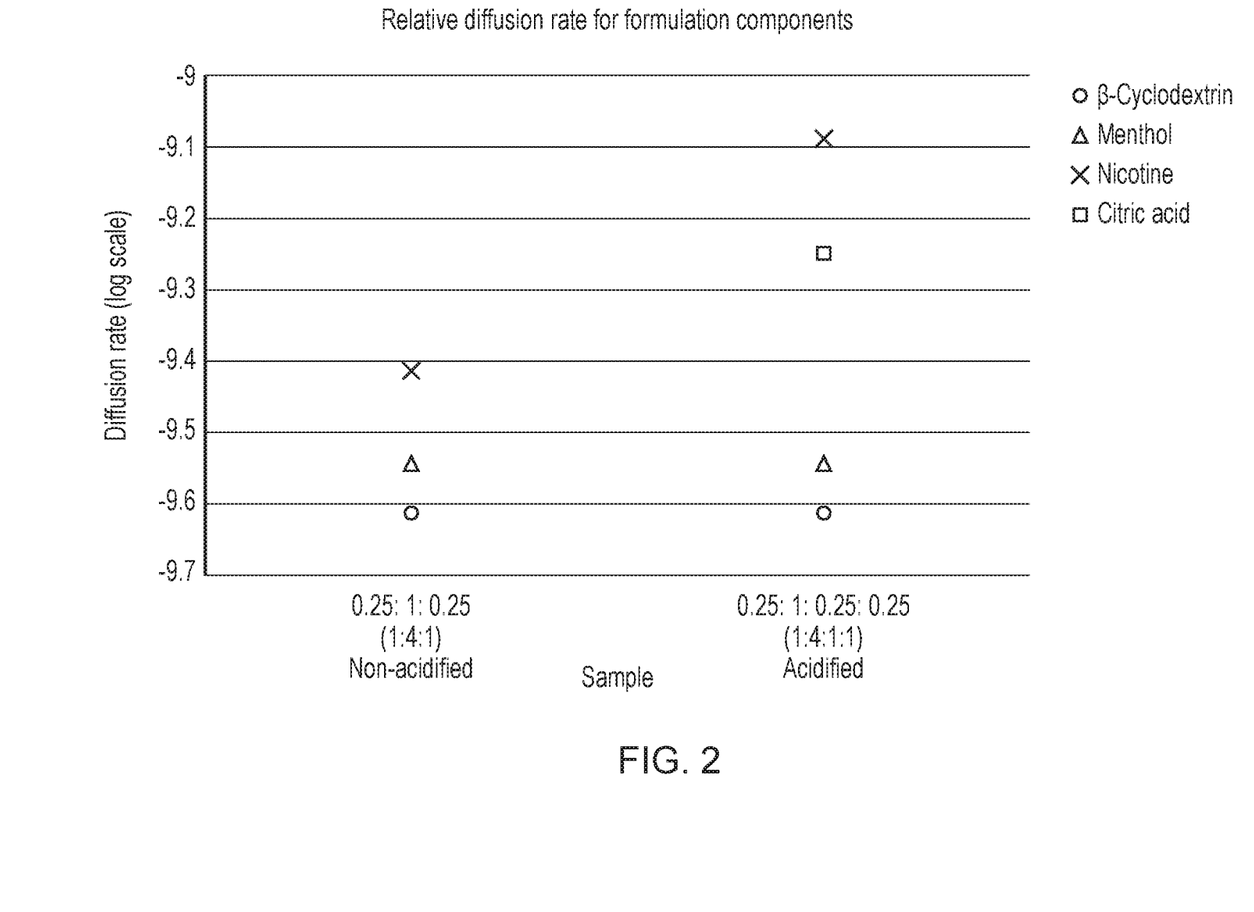
FIG. 2 shows relative diffusion rates for nicotine, 2-hydroxy-propyl-β-cyclodextrin, menthol and citric acid (acidified solution only) in the formulations.

Results of the study showed that monoprotonated nicotine had a faster diffusion coefficient compared to the nicotine without citric acid, suggesting the unprotonated nicotine has a higher residence within 2-hydroxy-propyl-β-cyclodextrin than mono-protonated nicotine. Results of the study suggest that the residency time of menthol within 2-hydroxy-propyl-β-cyclodextrin was higher than that of nicotine in both its monoprotonated and unprotonated form. The results also suggest that protonating nicotine decreases the interaction with 2-hydroxy-propyl-β-cyclodextrin. The data suggests that the residency times of the compounds within 2-hydroxy-propyl-β-cyclodextrin are the following:

mono-protonated nicotine<unprotonated nicotine<menthol (FIG. 2).

We have found that protonating nicotine reduces its residency time in encapsulating materials such as cyclodextrin. By this modification, flavors are encapsulated in preference to nicotine and in particular, protonated nicotine. Thus there is encouraged and provided a system in which the molar ratio of (a) encapsulating material encapsulating the one or more flavors to (b) unencapsulated flavors is greater than the molar ratio of (c) encapsulating material encapsulating nicotine to (d) unencapsulated nicotine.

Various modifications and variations of the present invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

The invention claimed is:

1. An aerosolizable formulation comprising:
   (i) water in an amount of at least 30 wt. % based on the aerosolizable formulation;
   (ii) nicotine;
   (iii) at least one acid;
   (iv) one or more flavors; and
   (v) one or more encapsulating materials, wherein the one or more encapsulating materials encapsulates at least one of the one or more flavors in preference to protonated nicotine, and wherein the one or more encapsulating materials are present in a total amount of from 0.001 to 20 wt. % based on the aerosolizable formulation;
   wherein a first molar ratio of (a) encapsulating material encapsulating the one or more flavors to (b) unencapsulated flavors is greater than a second molar ratio of (c) encapsulating material encapsulating nicotine to (d) unencapsulated nicotine.

2. The aerosolizable formulation according to claim 1, wherein water is present in an amount of at least 75 wt. % based on the aerosolizable formulation.

3. The aerosolizable formulation according to claim 1, wherein water is present in an amount of at least 90 wt. % based on the aerosolizable formulation.

4. The aerosolizable formulation according to claim 1, wherein the nicotine is present in an amount of no greater than 1 wt. % based on the aerosolizable formulation.

5. The aerosolizable formulation according to claim 4., wherein nicotine is present in an amount of from 0.01 wt. % to 0.6 wt. % based on the aerosolizable formulation.

6. The aerosolizable formulation according to claim 1, wherein the at least one acid is selected from the group consisting of acetic acid, lactic acid, formic acid, citric acid, benzoic acid, pyruvic acid, levulinic acid, succinic acid, tartaric acid, sorbic acid, propionic acid, phenylacetic acid, and mixtures thereof.

7. The aerosolizable formulation according to claim 1, wherein the at least one acid comprises citric acid.

8. The aerosolizable formulation according to claim 1, wherein the at least one acid is citric acid.

9. The aerosolizable formulation according to claim 1, wherein a total content of acid present in the formulation is no greater than 1 mole equivalents based on the nicotine.

10. The aerosolizable formulation according to claim 1, wherein a total content of acid present in the solution is no less than 0.1 mole equivalents based on the nicotine.

11. The aerosolizable formulation according to claim 1, wherein at least 70 wt % of the nicotine is in a protonated form.

12. The aerosolizable formulation according to claim 1, wherein at least 90 wt % of the nicotine is in a protonated form.

13. The aerosolizable formulation according to claim 1, wherein the one or more flavors selected from the group consisting of (4-(para-) methoxyphenyl)-2-butanone, vanillin, γ-undecalactone, menthone, 5-propenyl guaethol, menthol, para-mentha-8-thiol-3-one and mixtures thereof.

14. The aerosolizable formulation according to claim 1, wherein the one or more flavors comprises menthol.

15. The aerosolizable formulation according to claim 1, wherein the one or more flavors are present in a total amount of no greater than 10 wt. % based on the aerosolizable formulation.

16. The aerosolizable formulation according to claim 1, wherein the one or more flavors are present in a total amount of from 0.1 to 1 wt. % based on the aerosolizable formulation.

17. The aerosolizable formulation according to claim 1, wherein the one or more encapsulating materials are selected from the group consisting of micelles, cyclodextrins, calixarenes, metal organic frameworks, dendrimers, polymers, hydrocolloids, pollen spores, yeast particles, porous silica, and mixtures thereof.

18. The aerosolizable formulation according to claim 1, wherein the one or more encapsulating materials comprises one or more cyclodextrins.

19. The aerosolizable formulation according to claim 18, wherein the one more cyclodextrins is selected from the group consisting of substituted (α)-cyclodextrin, unsubstituted (α)-cyclodextrin, substituted (β)-cyclodextrin, unsubstituted (β)-cyclodextrin, substituted (γ)-cyclodextrin, unsubstituted (γ)-cyclodextrin, and mixtures thereof.

20. The aerosolizable formulation according to claim 18, wherein the one more cyclodextrins is at least a substituted (β)-cyclodextrin.

21. The aerosolizable formulation according to claim 1, wherein the one or more encapsulating materials are present in a total amount of no greater than 12 wt. % based on the aerosolizable formulation.

22. The aerosolizable formulation according to claim 1, wherein the one or more encapsulating materials are present in a total amount of from 5 to 12 wt. % based on the aerosolizable formulation.

23. The aerosolizable formulation according to claim 1, wherein the first molar ratio of (a) to (b) is at least two times the second molar ratio of (c) to (d).

24. The aerosolizable formulation according to claim 1, wherein the first molar ratio of (a) to (b) is at least four times the second molar ratio of (c) to (d).

25. The aerosolizable formulation according to claim 1, wherein the first molar ratio of (a) to (b) is at least nine times the second molar ratio of (c) to (d).

26. A process for forming an aerosolizable formulation, the aerosolizable formulation comprising:
   (i) water
   (ii) nicotine;
   (iii) at least one acid;
   (iv) one or more flavors; and (v) one or more encapsulating materials, wherein the one or more encapsulating materials are present in a total amount of from 0.001 to 20 wt. % based on the aerosolizable formulation;

the process for forming the aerosolizable formulation comprising the steps of:
(a) contacting nicotine with the at least one acid to form partially or completely protonated nicotine; and
(b) contacting the partially or completely protonated nicotine with water, the one or more flavors and the one or more encapsulating materials;

wherein the one or more encapsulating materials encapsulates at least one of the one or more flavors in preference to the partially or completely protonated nicotine.

27. The process according to claim 26, further comprising preparing a flavor solution comprising (i) water; (iv) the one or more flavors; and (v) the one or more encapsulating materials; and contacting the partially or completely protonated nicotine with the flavor solution.

28. The process according to claim 27, wherein a first molar ratio of (a) encapsulating material encapsulating the one or more flavors to (b) unencapsulated flavors is greater than a second molar ratio of (c) encapsulating material encapsulating nicotine to (d) unencapsulated nicotine.

29. A contained aerosolizable formulation comprising:
(a) a container; and
(b) an aerosolizable formulation, the aerosolizable formulation comprising
(i) water in an amount of at least 30 wt. % based on the aerosolizable formulation;
(ii) nicotine;
(iii) at least one acid;
(iv) one or more flavors; and
(v) one or more encapsulating materials, wherein the one or more encapsulating materials encapsulates at least one of the one or more flavors in preference to protonated nicotine, and wherein the one or more encapsulating materials are present in a total amount of from 0.001 to 20 wt. % based on the aerosolizable formulation;

wherein a first molar ratio of (a) encapsulating material encapsulating the one or more flavors to (b) unencapsulated flavors is greater than a second molar ratio of (c) encapsulating material encapsulating nicotine to (d) unencapsulated nicotine.

30. The contained aerosolizable formulation according to claim 29, wherein the container is configured for engagement with an electronic aerosol provision system.

31. An electronic aerosol provision system comprising:
(a) an aerosolizer for aerosolizing an aerosolizable formulation for inhalation by a user of the electronic aerosol provision system;
(b) a power supply comprising a cell or battery for supplying power to the aerosolizer;
(c) the aerosolizable formulation, comprising
(i) water in an amount of at least 30 wt. % based on the aerosolizable formulation;
(ii) nicotine;
(iii) at least one acid;
(iv) one or more flavors; and
(v) one or more encapsulating materials, wherein the encapsulating material encapsulates at least one of the one or more flavors in preference to protonated nicotine, and wherein the one or more encapsulating materials are present in a total amount of from 0.001 to 20 wt. % based on the aerosolizable formulation;

wherein a first molar ratio of (a) encapsulating material encapsulating the one or more flavors to (b) unencapsulated flavors is greater than a second molar ratio of (c) encapsulating material encapsulating nicotine to (d) unencapsulated nicotine.

* * * * *